United States Patent [19]

Isozaki et al.

[11] Patent Number: 4,973,477
[45] Date of Patent: Nov. 27, 1990

[54] COATING COMPOSITIONS FOR PREVENTING ADHESION OF ORGANISMS

[75] Inventors: Osamu Isozaki, Yokohama; Naozumi Iwasawa, Hiratsuka; Toshiro Hirama, Fujisawa; Hiroshi Iwai, Atsugi, all of Japan

[73] Assignee: Kansai Paint Company, Limited, Amagasaki, Japan

[21] Appl. No.: 317,501

[22] Filed: Mar. 1, 1989

[30] Foreign Application Priority Data

Mar. 2, 1988 [JP] Japan .................................. 63-50232
Mar. 8, 1988 [JP] Japan .................................. 63-55396

[51] Int. Cl.$^5$ ...................... A61K 31/74; C08F 22/10; C08F 20/52; C08F 122/10
[52] U.S. Cl. ...................................... 424/78; 523/122; 526/320; 526/292.4; 526/323; 526/292.3; 526/304; 526/321; 526/322; 524/558; 524/559
[58] Field of Search ...................... 526/320, 292.4, 323, 526/292.3, 304, 321, 322; 523/122; 424/78; 524/558, 559

[56] References Cited

FOREIGN PATENT DOCUMENTS 2183240 6/1987 United Kingdom .

OTHER PUBLICATIONS

CA 84: 123506m Thermosetting powder coating composition, Yoshio et al. (1976).

CA 82: 18799v, Coating Composition, Kimura et al. (1975).

CA 84: 1235099, Resin powder coating composition, Hayashi et al. (1976).

Primary Examiner—Merrell C. Cashion, Jr.
Assistant Examiner—Carmen B. Pili-Curtis
Attorney, Agent, or Firm—Armstrong, Nikaido, Marmelstein, Kubovcik & Murray

[57] ABSTRACT

Disclosed are a coating composition (A) for preventing adhesion of organisms which comprises as its vehicle component a homopolymer or a copolymer, the homopolymer being one prepared by homopolymerizing a phenol-modified unsaturated monomer obtained by reacting (a) an unsaturated monomer containing epoxy group and/or hydroxyl group with (b) an addition reaction product of a phenolic compound with a compound having one carboxylic anhydride group per molecule, and the copolymer being one prepared by copolymerizing said phenol-modified unsaturated monomer and a radically polymerizable unsaturated monomer, and also a coating composition (B) for preventing adhesion of organisms which comprises as its vehicle component a phenol-modified resin prepared by reacting (c) a resin containing epoxy group and/or hydroxyl group with (b) an addition reaction product of a phenolic compound with a compound having one carboxylic anhydride group per molecule.

Also disclosed is a method for preventing adhesion of organisms, characterized by coating a substrate with the coating composition (A) or (B).

6 Claims, No Drawings

COATING COMPOSITIONS FOR PREVENTING ADHESION OF ORGANISMS

The present invention relates to novel coating compositions for preventing adhesion of organisms, and to novel methods of preventing adhesion of organisms on the surfaces of base materials or members of buildings, underwater structures and the like by applying said coating compositions to the surfaces Numerous underwater organisms such as barnacles, ascidians, serpules, mussels, freshwater mussels, polyzor, green laver and laver live in sea, rivers, lakes, marshes or the like. When underwater structures such as harbor facilities, buoys, pipelines, bridges, submarine facilities, culture nets and fish trapping nets are installed in such a body of water, or ships navigate thereon, underwater organisms deposit and grow on the surface of the submerged portion to other portions exposed to splashes of water to cause harm or damage to the structure or ship. For example, underwater organisms, when deposited on the hull, offer increased friction resistance to water to reduce the speed of navigation, necessitating an increased amount of fuel consumption to maintain the specified speed, hence an economical disadvantage. Further when underwater organisms become deposited on structures, such as harbor facilities, which are submerged or at the surface of water, such structures encounter difficulties in serving their intended functions, and the base material of the structure is likely to become corroded. Adhesion of underwater organisms on culture nets or fish trapping nets will clog up the meshwork structure, possibly causing death to fish.

To prevent underwater organisms from depositing and growing on the underwater structure, it has been common practice to coat the structure with an antifouling coating composition comprising a vinyl chloride resin, rosin or like vehicle component, a plasticizer and an antifouling agent or an antifouling coating composition comprising as its vehicle component a homopolymer or a copolymer prepared from an organotin-containing unsaturated monomer (e.g. see Japanese Examined Patent Publications Nos. 21426/1965; 9579/1969 and 12049/1976). The adhesion of underwater organisms can be almost prevented by application of these coating compositions. Yet because of use of highly toxic antifouling agent and organotin-containing unsaturated monomer, the coating compositions are not desirable to the human body from the viewpoint of safety of the environment and hygiene when the coating composition is produced or applied. Moreover, the toxic antifouling agent gradually dissolves out from the coating in the water and eventually causes water pollution, exerting an adverse influence on fish and shellfish to the point of posing a social problem.

In view of the above situation, it has been proposed to use an antifouling coating composition of little or no toxicity containing, for example, a phosphorus nitride compound (see Japanese Unexamined Patent Publication No. 131076/1987). However, this coating composition has the drawback of being unsatisfactory in the antifouling property.

Further fungi and like microorganisms deposit and grow on inner and outer walls of buildings and other facilities to produce various secretions, posing problems from the viewpoint of environmental hygiene as well as beauty. Furthermore, even when such buildings or facilities are coated with the coating composition, the adhesion and growth of such microorganisms stain the film appearance and cause the film deterioration or peeling, rendering the film unable to serve the intended functions. To prevent adhesion of fungi and like microorganisms, it has been proposed to use fungicidal coating compositions comprising a haloarylsulfonic, organotin, dithiocarbamate or like fungicidal agent. However, these coating compositions are low in fungicidal property when having reduced toxicity, or exhibit high toxicity when given an enhanced fungicidal property, raising a problem from the viewpoint of environmental hygiene. Thus, these coating compositions fail to meet these two requirements and fail to exhibit a sustained effect as desired.

Now there is a demand for coating compositions for preventing adhesion of organisms which are outstanding in ability to prevent adhesion of underwater organisms and microorganisms, namely in antifouling property and fungicidal property, and free of environmental hygienic problems.

An object of the present invention is to provide novel coating compositions for preventing adhesion of organisms which can exhibit the desired degrees of antifouling property and fungicidal property for a prolonged period of time, and novel methods for preventing adhesion of organisms using said coating compositions.

Another object of the invention is to provide novel coating compositions for preventing adhesion of organisms which are outstanding in antifouling property and fungicidal property and free of environmental hygienic problems, and novel methods for preventing adhesion of organisms using said coating compositions.

Other objects and features of the present invention will become apparent from the following description.

The present invention provides a coating composition (A) for preventing adhesion of organisms which comprises as its vehicle component a homopolymer or a copolymer, said homopolymer being one prepared by homopolymerizing a phenol-modified unsaturated monomer obtained by reacting (a) an unsaturated monomer containing epoxy group and/or hydroxyl group with (b) an addition reaction product of a phenolic compound with a compound having one carboxylic anhydride group per molecule, and said copolymer being one prepared by copolymerizing said phenol-modified unsaturated monomer and a radically polymerizable unsaturated monomer, and a method for preventing adhesion of organisms, characterized by coating a substrate with the coating composition (A).

The present invention also provides a coating composition (B) for preventing adhesion of organisms which comprises as its vehicle component a phenol-modified resin prepared by reacting (c) a resin containing epoxy group and/or hydroxyl group with (b) an addition reaction product of a phenolic compound with a compound having one carboxylic anhydride group per molecule, and a method for preventing adhesion of organisms, characterized by coating a substrate with the coating composition (B).

In view of the foregoing situation, we conducted extensive research and found that the coating composition (A) comprising as its vehicle component the above-specified phenol ester group-containing polymer and the coating composition (B) comprising as its vehicle component the above-specified phenol ester group-containing resin are outstanding in antifouling property and fungicidal property and free of environmental hygienic problems.

The present invention has been accomplished on the basis of the foregoing novel finding.

Described below is the coating composition (A) for preventing adhesion of organisms according to this invention.

Of the starting materials for the polymer useful as the vehicle component in the coating composition (A), the epoxy group- and/or hydroxyl group-containing unsaturated monomer as the component (a) is bonded to the carboxylic acid of the component (b) by an ester linkage. Preferred examples of the epoxy group-containing unsaturated monomers as the component (a) are glycidyl acrylate or methacrylate, β-methyl glycidyl acrylate or methacrylate, 3,4-epoxycyclohexylmethyl acrylate or methacrylate, allyl glycidyl ether, p-vinylphenyl glycidyl ether and the like. Suitable examples of the hydroxyl group-containing unsaturated monomer as the component (a) are 2-hydroxyethyl acrylate or methacrylate, 2-hydroxypropyl acrylate or methacrylate, 3-hydroxypropyl acrylate or methacrylate and the like.

Of the starting materials for the polymer useful in the present invention, the addition reaction product as the component (b) is a compound prepared by addition reaction of a phenolic compound with a carboxylic anhydride compound and having one carboxyl group per molecule.

Useful phenolic compounds are those having hydrogen atom on the aromatic ring substituted with phenolic hydroxyl group in an amount of at least one per molecule. Examples of useful phenolic compounds are monohydric or polyhydric phenolic compounds represented by the formula

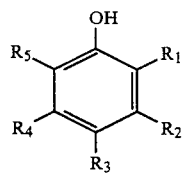

(I)

wherein $R_1$, $R_2$, $R_3$, $R_4$ and $R_5$ each represent hydrogen atom, halogen atom, hydroxyl group, alkyl group, alkoxy group, nitro group, cyano group or amino group; and polyhydric phenolic compounds represented by the formula

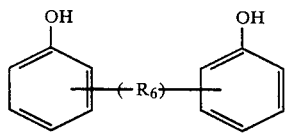

(II)

wherein the hydrogen atom on the aromatic ring may be unsubstituted or substituted with halogen atom, hydroxyl group, alkyl group, alkoxy group, nitro group, cyano group or amino group, and $R_6$ represents alkylene group, —O—, —CH$_2$O—, —CH$_2$OCH$_2$— or —SO$_2$—.

The above-mentioned terms used in respect of the compounds of the formulas (I) and (II) denote or include the following. Examples of the halogen atom are fluorine atom, chlorine atom, bromine atom and the like. Preferred examples of the alkyl group are those having 1 to 8 carbon atoms. Preferred examples of the alkoxy group are those having 1 to 8 carbon atoms and including methoxy, ethoxy, propoxy, butoxy, pentoxy, octyloxy and the like. The amino group refers to the group wherein —NH$_2$ and one or two hydrogen atoms of —NH$_2$ are substituted with alkyl group, such as —NHCH$_3$, —NHC$_2$H$_5$, —NHC$_3$H$_7$, —N(CH$_3$)$_2$, —N(C$_2$H$_5$)$_2$, —N(C$_3$H$_7$)$_2$, —N(C$_4$H$_9$)$_2$, etc. The alkylene group refers to the group represented by the formula —C$_n$H$_{2n}$— wherein n is preferably an integer of 1 to 5, such as —CH— and

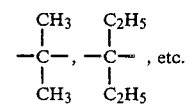

Preferred examples of the compounds of the formula (I) are monohydric phenolic compounds, catechol, resorcin, hydroquinone, pyrogallol, hydroxyhydroquinone, chloroglycine, etc. Representative monohydric phenolic compounds are phenols such as phenol (carbolic acid), o-cresol, m-cresol, p-cresol, 2,3-xylenol, 2,4-xylenol, 2,5-xylenol, 2,6-xylenol, 3,4-xylenol, 3,5-xylenol, o-ethylphenol, m-ethylphenol, p-ethylphenol, p-tert-amylphenol, p-tert-butylphenol, p-phenylphenol, p-cyclohexylphenol, m-methoxyphenol and the like and derivatives thereof; phenols substituted with halogen atom such as o-chlorophenol, p-chlorophenol, 2,4,6-trichlorophenol, pentachlorophenol, 2,4,6-tribromophenol and the like; phenols substituted with nitro group such as o-nitrophenol, p-nitrophenol, 2,4-dinitrophenol, 2,4,6-trinitrophenol and the like; phenols substituted with amino group such as p-dimethylaminophenol and the like; and phenols substituted with cyano group such as p-cyanophenol and the like. Preferred examples of the compounds of the formula (II) are 2,2-bis(4-hydroxyphenyl)propane [bisphenol A], 2,2-bis(4-hydroxyphenyl)butane [bisphenol B], 1,1-bis(4-hydroxyphenyl)ethane, bis(4-hydroxyphenyl)methane bisphenol F], 4-hydroxyphenyl ether, p-(4-hydroxy)phenol,

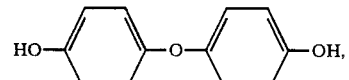

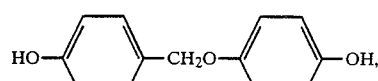

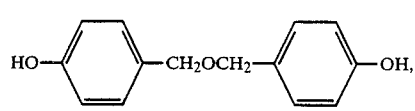

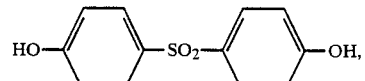

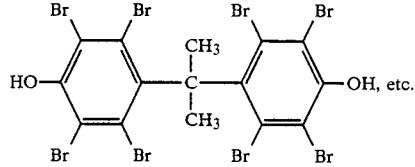

Among them, the monohydric phenolic compounds are more preferred because they can be readily reacted with compounds having carboxylic anhydride group and enable the preparation of the addition reaction product as the component (b) without increase of viscosity nor gelation. The above phenolic compounds are usable singly or at least two of them can be used in mixture.

The carboxylic anhydride compound to be reacted with the phenolic compound is not specifically limited insofar as the compound has one carboxylic anhydride group per molecule. Preferred examples of such compounds are saturated aliphatic carboxylic anhydrides represented by the formula

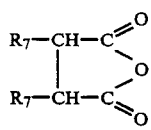  (III)

wherein $R_7$ represents hydrogen atom or alkyl group having 1 to 18 carbon atoms, preferably 1 to 12 carbon atoms,

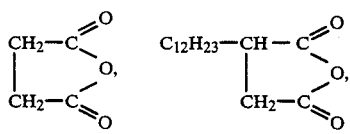

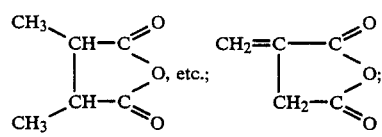

unsaturated aliphatic carboxylic anhydrides represented by the formula

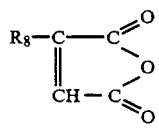  (IV)

wherein $R_8$ represents hydrogen atom or alkyl group having 1 to 6 carbon atoms such as

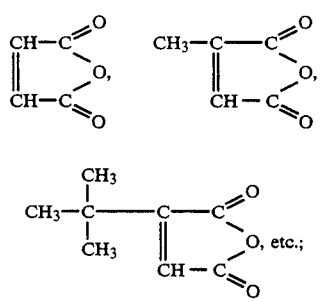

cyclohexanecarboxylic anhydrides represented by the formula

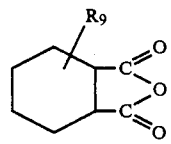  (V)

wherein $R_9$ represents hydrogen atom or alkyl group having 1 to 8 carbon atoms, preferably 1 to 4 carbon atoms, such as

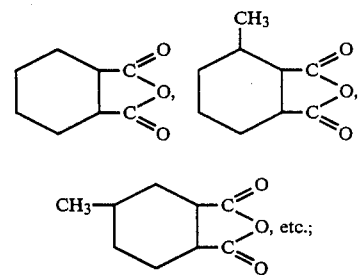

cyclohexenecarboxylic anhydrides represented by the formula

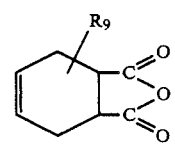  (VI)

wherein $R_9$ is as defined above and those represented by the formula

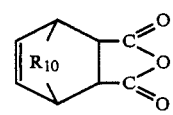  (VII)

wherein $R_{10}$ represents —$CH_2$—, —$CH_2$—$CH_2$— or

and the hydrogen atom on the ring

may be unsubstituted or substituted with halogen atom (such as fluorine, chlorine, bromine or the like), alkyl group having 1 to 8 carbon atoms or the like, such as

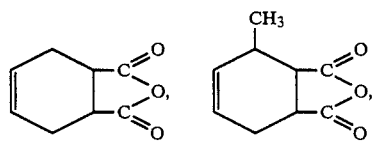

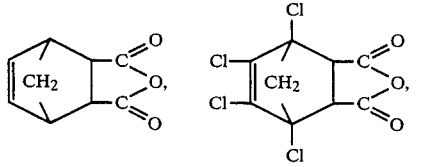
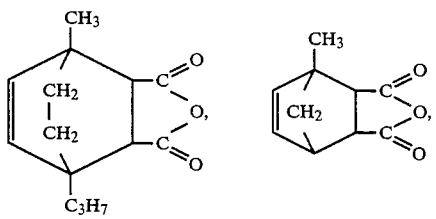
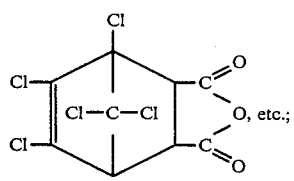

aromatic carboxylic anhydrides represented by the formula

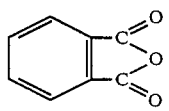     (VIII)

wherein the hydrogen atom on the aromatic ring may be unsubstituted or substituted with halogen atom (such as fluorine, chlorine, bromine or the like), alkyl group having 1 to 10 carbon atoms, phenyl group or the like, such as

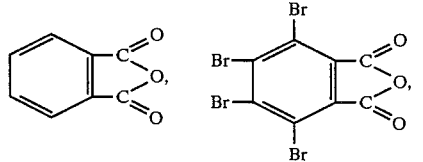
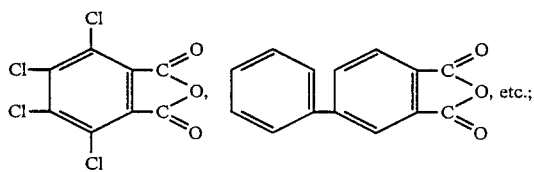

bicyclo saturated aliphatic carboxylic anhydrides represented by the formula

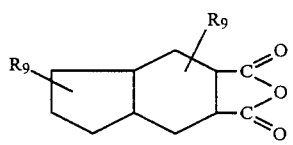     (IX)

wherein $R_9$ is as defined above such as

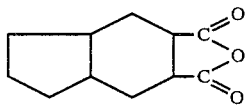

The addition reaction product of the phenolic compound and the compound with one carboxylic anhydride group per molecule can be prepared usually by subjecting to addition reaction a mixture of monohydric and/or polyhydric phenolic compound and compound with one carboxylic anhydride group per molecule in the presence or the absence of a catalyst at a temperature of about 100° to about 300° C., preferably about 150° to about 200° C. while monitoring the acid value of the resin so that the reaction is terminated when the resin has reached approximately half the theoretical acid value thereof. When required, the mixture is used as dissolved or dispersed in an inert organic solvent.

Examples of useful inert organic solvents are aromatic hydrocarbons, cellosolves, glymes or diglymes, petroleum, etc.

Examples of useful catalysts are picoline, triethylamine, tributylamine, pyridine, tri-2-ethylhexylamine, etc.

The proportions of the phenolic compound and the compound having one carboxylic anhydride group per molecule for use in the invention are such that about 0.9 to about 1.1 moles of the latter is used per mole of the former. Use of less than about 0.9 mole of the latter increases the proportion of chemically unbonded free phenolic compound component in the finally obtained polymer, making it difficult to form a coating excellent in the antifouling property and fungicidal property. On the other hand, use of more than about 1.1 moles thereof enhances the hydrophilic property of coating to an extent of entailing difficulty in sustaining a high antifouling effect and fungicidal effect for a long term.

The phenol-modified unsaturated monomer prepared by reacting the components (a) and (b) is a monomer having about one radically polymerizable unsaturated bond per molecule and a group or groups capable of giving a phenolic compound on hydrolysis.

The reaction between the epoxy group- and/or hydroxyl group-containing unsaturated monomer as the component (a) and the addition reaction product as the component (b) is conducted usually by reacting a mixture of the components (a) and (b) in the presence of a polymerization inhibitor (such as hydroquinone, parabenzoquinone, hydroquinone monomethyl ether or the like) at a temperature of about 80° to about 150° C., preferably about 100° to about 130° C. when using an epoxy group-containing unsaturated monomer as the component (a), or a temperature of about 100° to about 250° C., preferably about 150° to about 200° C. when using a hydroxyl group-containing unsaturated monomer as the component (a), while monitoring the acid value of the resin so that the reaction is terminated when the acid value of less than 1 has been achieved. Use of the epoxy group-containing unsaturated monomer as the component (a) in the reaction is desirable because the epoxy group is caused to react easily with the carboxyl group of the component (b) at a relatively low temperature, giving a high-purity phenol-modified unsaturated monomer. Catalysts useful in the reaction of the epoxy group-containing unsaturated monomer with the component (b) are, for example, amines such as tributylamine, pyridine and the like and quaternary ammonium salts such as tetraethyl ammonium bromide and the like.

The polymer for use in the invention is a homopolymer prepared by homopolymerizing the phenol-modified unsaturated monomer obtained by reacting the epoxy group- and/or hydroxyl group-containing unsaturated monomer as the component (a) with the reaction product as the monomer (b) or a copolymer prepared by copolymerizing the phenol-modified unsaturated monomer with a radically polymerizable unsaturated monomer. These polymers contain the hydrolytic phenol ester group resulting from the phenolic compound.

Useful radically polymerizable unsaturated monomers can be selected from a wide range of monomers according to the desired properties. Examples of such unsaturated monomers are as follows:

(I) esters of acrylic or methacrylic acids: e.g. $C_{1-18}$ alkyl acrylate or methacrylate such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate, lauryl methacrylate and the like; $C_{2-18}$ alkoxyalky acrylate or methacrylate such as methoxybutyl acrylate or methacrylate, methoxyethyl acrylate or methacrylate, ethoxybutyl acrylate or methacrylate and the like; $C_{2-8}$ alkenyl acrylate or methacrylate such as allyl acrylate or methacrylate and the like; $C_{2-8}$ hydroxyalkyl acrylate or methacrylate such as hydroxyethyl acrylate or methacrylate, hydroxypropyl acrylate or methacrylate and the like; and $C_{3-18}$ alkenyloxyalkyl acrylate or methacrylate such as allyloxyethyl acrylate or methacrylate and the like;

(II) acid group-containing compounds such as acrylic acid, methacrylic acid, maleic acid, maleic anhydride, itaconic acid, citraconic acid and the like;

(III) vinyl aromatic compounds such as styrene, α-methylstyrene, vinyltoluene, p-chlorostyrene and the like;

(IV) polyolefin compounds such as butadiene, isoprene, chloroprene and the like; and (V) others including acrylonitrile, methacrylonitrile, methyl isopropenyl ketone; vinyl acetate, Veoba monomer (trade name, product of Shell Chemical Co., Ltd., U.S.), vinyl propionate, vinyl pivalate and the like.

The foregoing polymerization can be effected by known methods, for example, by adding dropwise the phenol-modified unsaturated monomer or a mixture of said monomer and the radically polymerizable unsaturated monomer along with a polymerization initiator to a solvent (heated to usually about 70° to about 150° C., preferably about 90° to about 130° C.) for polymerization. The solvent for use herein is not specifically limited insofar as it is an inert one capable of dissolving or dispersing the unsaturated monomer or the polymer produced from the monomer such as aromatic solvents, alcohols, esters, ethers, ketones or the like. Useful polymerization initiators include azo compounds, percarbonate compounds, peroxide compounds, diazo compounds, nitroso compounds, redox-type initiators and initiators usable in a radical polymerization involving irradiation with ionizing radioactive rays.

The polymer for use in the invention can contain phenol ester group in an amount of about 0.01 to about 10 moles, preferably about 0.1 to about 5 moles, per kilogram of the polymer. The phenol ester group content of less than about 0.01 mole fails to give a coating which is outstanding in antifouling property and fungicidal property, hence undesirable. On the other hand, the phenol ester group content exceeding about 10 moles is undesirable because the resulting coating wears out at such a high rate that the coating can not sustain the antifouling property nor the fungicidal property for a long term.

The molecular weight of the polymer for use herein is not specifically limited and can be suitably determined according to the required properties. The weight-average molecular weight of the polymer ranges usually from about 5000 to about 100000, preferably from about 10000 to about 50000. The molecular weight of less than about 5000 fails to give a coating capable of sustaining the antifouling property and fungicidal property for a long term, whereas the molecular weight of more than about 100000 results in a coating having a reduced degree of hydrolytic property and unable to achieve high antifouling and fungicidal effects.

The homopolymer or copolymer thus obtained is used as the vehicle component for the coating composition (A) for preventing adhesion of organisms according to the invention and can exhibit a high antifouling property and a high fungicidal property.

Described below is the coating composition (B) for preventing adhesion of organisms according to the present invention.

Of the components of phenol-modified resin to be used as the vehicle component in the coating composition (B), the epoxy group- and/or hydroxyl group-containing resin as the component (c) is not specifically limited and can be any of known organic resins insofar as the resin has epoxy group and/or hydroxyl group reactive with the carboxyl group in the other component, i.e. component (b). Examples of suitable organic resins are an epoxy group-containing polymer consisting essentially of an epoxy group-containing unsaturated monomer such as glycidyl acrylate or methacrylate, allyl glycidyl ether, 3,4-epoxycyclohexylmethyl acrylate or methacrylate or the like; a hydroxyl group-containing polymer consisting essentially of hydroxyl group-containing unsaturated monomer such as 2-hydroxyethyl acrylate or methacrylate, 2-hydroxypropyl acrylate or methacrylate or the like; a hydroxyl group-containing polyester or alkyd resin prepared by reacting a polybasic acid component such as phthalic anhydride, isophthalic acid, terephthalic acid or the like with an polyhydric alcohol component such as neopentyl glycol, trimethylolpropane or the like, together with, when required, a monohydric fatty acid component; epoxy resins such as Epon 812, 828, 834, 1001, 1002, 1004, 1007 or 1009 (trademarks for products of Shell Co., Ltd.) or Araldite 502, 6005, 6071, 6084, 6097 or 6099 (trademarks for products of Ciba-Geigy, Switzerland), these resins modified with, e.g. saturated fatty acids, alkyd resins, urethane compounds, acrylic resins or the like or silicone resins; etc.

The molecular weight of epoxy group- and/or hydroxyl group-containing resin serving as the component (c) is not specifically limited. It is suitable that the resin have a weight-average molecular weight of about 500 to about 100000, preferably about 1000 to about 50000. The molecular weight of less than about 500 is undesirable since the resulting coating can not sustain the organism adhesion-preventing effect for a long term. On the other hand, the molecular weight of more than about 100000 is undesirable because it reduces the hydrolytic property of coating surface, rendering the coating unlikely to sustain the antifouling property and fungicidal property for a long term.

Of the components of the phenol-modified resin for use herein, the addition reaction product as the component (b) is a compound which can be prepared by addition reaction of a phenolic compound with a carboxylic anhydride compound and which has one carboxyl group per molecule, as stated hereinbefore in the description on the coating composition (A).

The reaction between the epoxy group- and/or hydroxyl group-containing resin as the component (c) and the addition reaction product as the component (b) is effected by known methods, for example by reacting a mixture of the components (c) and (b) or when required, the mixture as dissolved or dispersed in an inert organic solvent (e.g. aromatic solvents, ketones, esters or the like) at a temperature of about 80° to about 150° C., preferably about 100° to about 130° C. when using an epoxy group-containing resin as the component (c), or a temperature of about 100° to about 250° C., preferably about 150° to about 230° C. when using a hydroxyl group-containing resin as the component (c), while monitoring the acid value of the resin so that the reaction is terminated when the acid value of 1 or less has been attained. Use of epoxy group-containing resin as the component (c) in the reaction is suitable because the epoxy group is easily reacted with the carboxyl group of the component (b) at a relatively low temperature and thus a side reaction is less likely to occur, resulting in assured introduction of phenol component into the resin. Catalysts useful in the reaction of the epoxy group-containing resin with the component (b) include triethylamine, dimethylethanolamine or like amines, triethylamine ammonium bromide or like quaternary ammonium salts, etc.

The phenol-modified resin for use in the invention can contain phenol ester group in an amount of about 0.01 to about 10 moles, preferably about 0.1 to about 5 moles, per kilogram of the resin solids. The phenol ester group content of less than about 0.01 mole results in a coating without high antifouling property nor high fungicidal property, hence undesirable, whereas the phenol ester group content exceeding about 10 moles is undesirable because the resulting coating wears out at such a high rate that the coating can not retain the antifouling property nor the fungicidal property for a long term.

The molecular weight of the phenol-modified resin for use herein is not specifically limited and can be suitably determined according to the required properties. It is suitable that the resin have a weight-average molecular weight of about 5000 to about 100000, preferably about 10000 to about 50000. The molecular weight of less than about 5000 results in inability of coating to sustain the antifouling property and fungicidal property for a long term, hence undesirable, whereas the molecular weight of more than about 100000 produces a coating impaired in the degree of hydrolytic property and thus unable to attain excellent antifouling and fungicidal effects.

The thus obtained phenol-modified resin is used as the vehicle component for the coating composition (B) for preventing adhesion of organisms according to the invention and can exhibit an excellent antifouling property and fungicidal property.

The coating compositions (A) and (B) for preventing adhesion of organisms, although capable, themselves, of giving coatings outstanding in antifouling property and fungicidal property, may contain additives suitably selected according to the required properties, such as antifouling agent, fungicidal agent and the like. Examples of useful antifouling agents are copper-type agents such as cuprous oxide, copper rhodanide, copper thiocyanate, copper powders and the like; organotin-type agents such as triphenyltin fluoride, triphenyltin chloride, triphenyltin oxide and the like; and nitrogen-containing agents such as ethylenebis(dithiocarbamic acid)-zinc, ethylenebis(dithiocarbamic acid)manganese, tetramethylthiuram disulfide and the like. Examples of useful fungicidal agents are those of various types including haloarylsulfones, propargyl iodides, benzothiazols, dithiocarbamates, triazines, thiadiazines, isothiazolines, organotins, quaternary ammonium salts, indane bromides, nitriles, N-haloalkylthios, and the like. While suitably selectable according to the required properties and variable also according to their kinds, the amounts of antifouling agent and fungicidal agent for use herein are usually smaller than when incorporated in conventional antifouling coating compositions and fungicidal coating compositions. The amount of the antifouling agent, e.g. cuprous oxide is about 50% by weight or less, preferably about 5 to about 35% by weight, calculated as the solids in the coating composition. The amount of the fungicidal agent is about 2% by weight or less, calculated as the solids in the coating composition.

The coating compositions (A) and (B) may further contain known additives such as a coloring pigment, extender pigment, pigment dispersant, leveling agent, plasticizer, resin and the like, when so required.

The methods for preventing adhesion of organisms according to the present invention is practiced by applying the coating composition (A) or (B) to the base materials or members of buildings, underwater structures, etc. which need to be protected against the adhesion of organisms. More specifically, the coating compositions (A) and (B) are useful as interior finishing materials for use in houses and related facilities, and also in hospitals, breweries, food plants (e.g. bakeries), pharmaceutical manufacturing plants, electronic device manufacturing plants, etc. which must be biologically clean so as to protect the environment from microorganisms. The compositions are also useful for coating underwater structures (such as ships, harbor facilities, buoys, pipelines, bridges, submarine facilities, culture nets, fish trapping nets, etc.) to prevent underwater organisms from adhesion and growing on the structure. When applied to underwater structures, the compositions form coatings which exhibit an outstanding antifouling property over a prolonged period and have high safety for the human body. When the compositions are to be applied to the underwater structure, it is generally desirable to coat the structure with an anti-corrosive undercoat composition of the rubber chloride type and thereafter coat the resulting coating with the composition of the invention.

The coating compositions of the invention can be applied to the surface of the substrate, for example, by brush coating, spray coating, roller coating or dipping. The composition is applied usually in an amount of about 5 to about 400 g/m$^2$ although the amount is not limited specifically. Although the coating can be dried at room temperature, it can be dried by heating at a temperature of up to about 200° C. when so required.

The phenol-modified unsaturated monomer useful as the polymer component in the coating composition (A)

is an unsaturated monomer having the phenol ester group introduced therein with the addition reaction product of phenolic compound and carboxylic anhydride compound. Further the reaction between the phenolic compound and the carboxylic anhydride compound achieves a high reactivity, and the phenolic component has been introduced into the unsaturated monomer via the phenol ester group. Consequently the unsaturated group is away from the phenol component at a relatively long distance, rendering the unsaturated group less likely to be affected by the influence of steric hindrance due to the phenol component and facilitating the radical polymerization reaction of unsaturated group with the result that a polymer can be obtained at a high polymerization degree.

The phenol-modified resin of the coating composition (B) according to the invention is an epoxy group- and/or hydroxyl group-containing resin having the phenol ester group introduced therein with the addition reaction product of phenolic compound and carboxylic anhydride compound. Further the reaction between the phenolic compound and the carboxylic anhydride compound attains a high reactivity, and the phenolic component can be easily introduced into the side chain of the resin by reacting the addition reaction product with the epoxy group- and/or hydroxyl group-containing resin.

The coating composition (A) containing as the vehicle component a polymer of the phenol-modified unsaturated monomer and the coating composition (B) containing the phenol-modified resin as the vehicle component both produce coatings having a high antifouling property and high fundicidal property because in each composition, the phenol ester group is away from the main chain of polymer at a relatively long distance, making the phenol ester group less susceptible to the influence of steric hindrance by the main chain so that the coating is easily hydrolyzed with even a small amount of water, such as rain water or moisture in the air to release easily the phenol component from the coating surface, enabling attainment of high antifouling and fungicidal effects. The residual group released by the phenol component from the coating surface is caused to form carboxyl group. The carboxyl group thus formed is present at a relatively long distance away from the main chain of polymer and thus is made to form a carboxylic acid salt with a basic substance such as sea water or the like, free from the influence of main chain of polymer having hydrophobic property, resulting in a coating with a surface excellent in hydrophilic property. On submersion into water or sea water, the coating is dispersed or dissolved therein, whereby the coating surface is caused to dissolve out to prevent adhesion of organisms. In this way, the coating can sustain the effect of preventing adhesion of organisms for a prolonged period of time.

The present invention will be described below in greater detail with reference to the following preparation examples, examples and comparative examples in which the parts and percentages are all by weight.

Preparation of polymers for coating composition (A)

| Preparation Example 1 | |
|---|---|
| Phenol | 94 parts |
| Succinic anhydride | 100 parts |
| Tributylamine | 1 part |

The above ingredients were mixed together and reacted at 200° C. for 6 hours until the resin achieved the acid value/theoretical acid value ratio of 0.5. The reaction product thus obtained was in a solid form at room temperature and had a solids content of 100%. The following mixture was added to the reaction product.

| Glycidyl methacrylate | 142 parts |
|---|---|
| Hydroquinone | 0.2 part |

The mixture was reacted at 130° C. for 2 hours until the resin attained the acid value of 1 or less. The reaction mixture was then diluted with 337 parts of butanol, giving a phenol-modified unsaturated monomer having a solids content of 50% and a viscosity of B (Gardner-Holdt viscometer, 25° C., the same hereinafter).

The following mixture was added dropwise over a period of 3 hours to 337 parts of xylene heated to 100° C.

| Said phenol-modified unsaturated monomer | 674 parts |
|---|---|
| n-Butyl methacrylate | 337 parts |
| Azoisobutyronitrile | 13 parts |

The mixture was reacted at 100° C. for 2 hours, giving a copolymer solution I having a solids content of 50%, a viscosity of P and a weight-average molecular weight of 30000.

| Preparation Example 2 | |
|---|---|
| p-Chlorophenol | 129 parts |
| Succinic anhydride | 148 parts |
| Tributylamine | 1 part |

The above ingredients were mixed together and reacted at 250° C. for 3 hours until the resin reached the acid value/theoretical acid value ratio of 0.5. The reaction product thus obtained was in a solid form at room temperature and had a solids content of 100%. The following mixture was added to the reaction.

| Glycidyl acrylate | 128 parts |
|---|---|
| Parabenzoquinone | 0.2 part |

The mixture was reacted at 130° C. for 2 hours until the resin reached the acid value of 1 or less. The reaction mixture was then diluted with 406 parts of ethyl cellosolve, giving a phenol-modified unsaturated monomer having a solids content of 50% and a viscosity of G.

The following mixture was added dropwise over a period of 3 hours to 400 parts of butyl acetate heated to 110° C.

| Said phenol-modified unsaturated monomer | 812 parts |
|---|---|
| Methyl methacrylate | 200 parts |
| Styrene | 200 parts |

-continued

| | |
|---|---|
| Benzoyl peroxide | 8 parts |

The mixture was reacted at 110° C. for 2 hours, giving a copolymer solution II having a solids content of a viscosity of U and a weight-average molecular weight of 40000.

| Preparation Example 3 | |
|---|---|
| Bisphenol A | 228 parts |
| Tetrahydrophthalic anhydride | 152 parts |
| Pyridine | 10 part |
| Xylene | 370 parts |

The above ingredients were mixed together and reacted at 140° C. for 18 hours until the resin attained the acid value/theoretical acid value ratio of 0.5. The reaction product thus obtained had a solids content of 50%. The following mixture was added to the reaction product.

| | |
|---|---|
| 3,4-Epoxycyclohexyl methacrylate | 195 parts |
| Xylene | 195 parts |
| Hydroquinone | 0.5 part |

The mixture was reacted at 100° C. for 6 hours until the resin achieved the acid value of 1 or less, giving a phenol-modified unsaturated monomer having a solids content of 50% and a viscosity of H.

The following mixture was added dropwise over a period of 3 hours to 2300 parts of xylene heated to 120° C.

| | |
|---|---|
| Said phenol-modified unsaturated monomer | 1150 parts |
| 2-Ethylhexyl acrylate | 1150 parts |
| Styrene | 1150 parts |
| Azoisobutyronitrile | 144 parts |

The mixture was reacted at 120° C. for 2 hours, giving a copolymer solution III having a solids content of a viscosity of T and a weight-average molecular weight of 15000.

| Preparation Example 4 | |
|---|---|
| p-Cresol | 108 parts |
| Succinic anhydride | 100 parts |
| Tributylamine | 1 part |

The above ingredients were mixed together and reacted at 200° C. for 6 hours until the resin achieved the acid value/theoretical acid value ratio of 0.5. The reaction product thus obtained had a solids content of 100%. The following mixture was added to the reaction product.

| | |
|---|---|
| Glycidyl methacrylate | 142 parts |
| Hydroquinone monomethyl ether | 0.2 part |

The mixture was reacted at 120° C. for 3 hours until the resin attained the acid value of 1 or less and the obtained reaction product was diluted with 350 parts of butyl acetate, giving a phenol-modified unsaturated monomer having a solids content of 50% and a viscosity of AB.

The following mixture was added dropwise over a period of 3 hours to 450 parts of butyl acetate heated to 100° C.

| | |
|---|---|
| Said phenol-modified unsaturated monomer | 100 parts |
| Acrylic acid | 25 parts |
| 2-Hydroxyethyl methacrylate | 100 parts |
| Methyl methacrylate | 325 parts |
| Azoisobutyronitrile | 10 parts |

The mixture was reacted at 100° C. for 2 hours, giving a copolymer solution IV having a solids content of 50%, a viscosity of R and a weight-average molecular weight of 25000.

EXAMPLE 1

Using a paint conditioner, there were mixed together 56.0 parts of the copolymer solution I (50% solids content) prepared in Preparation Example 1, 5.0 parts of talc, 3.0 parts of red iron oxide, 0.5 part of "Erosil #200" (trademark for silica manufactured by Degussa, West Germany), 10.0 parts of cuprous oxide and 25.5 parts of ethylene glycol monoethyl ether for dispersion, giving an antifouling coating composition.

EXAMPLES 2 TO 7

Antifouling coating compositions were prepared in the same manner as done in Example 1 from the ingredients listed below in Table 1 in the amounts shown therein.

TABLE 1

| | Example | | | | | | |
|---|---|---|---|---|---|---|---|
| | 1 | 2 | 3 | 4 | 5 | 6 | 7 |
| Copolymer solution I | 56 | 64 | | | | | |
| Copolymer solution II | | | 56 | 64 | | | |
| Copolymer solution III | | | | | 64 | | |
| Copolymer solution IV | | | | | | 64 | 48 |
| Talc | 5 | | 5 | | | | |
| Red iron oxide | 3 | | 3 | | | | |
| Erosil #200 | 0.5 | 1.0 | 0.5 | 1.0 | 1.0 | 1.0 | 0.5 |
| Cuprous oxide | 10 | | | | | | 10 |
| Ethylenebis (dithiocarbamic acid) zinc | | 5 | | | | | 5 |
| Ethylene glycol monoethyl ether | 25.5 | 35.0 | 30.5 | 35.0 | 35.0 | 35.0 | 36.5 |
| Total amount | 100.0 | 100.0 | 100.0 | 100.0 | 100.0 | 100.0 | 100.0 |

COMPARATIVE EXAMPLES 1 TO 4

Each antifouling coating composition was prepared from the following mixture in the same manner as done in Example 1.

| Comparative Example 1 | |
|---|---|
| Vinyl chloride resin | 10.0 parts |
| Rosin | 10.0 parts |
| Tricresyl phosphate | 4.0 parts |
| Triphenyltin fluoride | 10.0 parts |
| Talc | 5.0 parts |
| Red iron oxide | 5.0 parts |
| Xylene | 28.0 parts |

| -continued | |
|---|---|
| Methyl isobutyl ketone | 28.0 parts |
| Total | 100 parts |
| Comparative Example 2 | |
| Synthetic rubber resin | 3.0 parts |
| Rosin | 10.0 parts |
| Tricresyl phosphate | 3.0 parts |
| Cuprous oxide | 50.0 parts |
| Talc | 5.0 parts |
| Baryta | 3.0 parts |
| Red iron oxide | 4.0 parts |
| Xylene | 22.0 parts |
| Total | 100 parts |
| Comparative Example 3 | |
| Vinyl chloride resin | 5.5 parts |
| Rosin | 5.5 parts |
| Tricresyl phosphate | 2.0 parts |
| Cuprous oxide | 30.0 parts |
| Triphenyltin hydroxide | 10.0 parts |
| Barium sulfate | 4.0 parts |
| Talc | 11.0 parts |
| Red iron oxide | 10.0 parts |
| Xylene | 11.0 parts |
| Methyl isobutyl ketone | 11.0 parts |
| Total | 100 parts |
| Comparative Example 4 | |
| Tributyltin methacrylate polymer solution (50% solids content) | 56.0 parts |
| Talc | 5.0 parts |
| Red iron oxide | 3.0 parts |
| Erosil #200 | 0.5 part |
| Cuprous oxide | 10.0 parts |
| Xylene | 25.5 parts |
| Total | 100 parts |

Using the coating compositions prepared in Examples 1 to 7 and Comparative Examples 1 to 4, antifouling test was conducted by the following method.

Antifouling test method

The coating composition to be tested was applied to a steel panel treated in sandblasting and coated with a zinc epoxy-type shop primer (15 μm coating thickness when dried) and with an epoxy-type anti-corrosive coating composition (200 μm coating thickness when dried) to form a coating having a 50 μm thickness when dried. The coated steel panel was dried for 7 days to provide a test panel. The test panels thus produced by application of coating compositions were immersed in Toba Bay, Mie Prefecture, Japan for 18 months to evaluate the antifouling property. Table 2 below shows the results (the figures indicate the areas, expressed in percentage, to which organisms were adhered).

TABLE 2

(Result of antifouling test)

| | Month of Immersion | | |
|---|---|---|---|
| | 6 | 12 | 18 |
| Example | | | |
| 1 | 0 | 0 | 0 |
| 2 | 0 | 0 | 5 |
| 3 | 0 | 0 | 0 |
| 4 | 0 | 0 | 5 |
| 5 | 0 | 0 | 5 |
| 6 | 0 | 0 | 5 |
| 7 | 0 | 0 | 0 |
| Comp. Example | | | |
| 1 | 0 | 10 | 30 |
| 2 | 0 | 0 | 15 |
| 3 | 0 | 0 | 0 |
| 4 | 0 | 0 | 0 |

The test results show that the antifouling coating compositions of the present invention exhibited a remarkable antifouling property.

EXAMPLE 8

A tank was charged with 1.4 parts of the copolymer solution I prepared in Preparation Example 1, 2.4 parts of xylene, 3.4 parts of butyl acetate, 23.2 parts of titanium oxide ("Titanium White JR 602" manufactured by Teikoku Kagaku K.K., Japan) and 1 part of N-(trichloromethylthio)phthalimide. The mixture was prekneaded by a stirrer and dispersed by a sand mill to a particle size of 30 μm or less. The obtained dispersion was placed into a tank containing 50.5 parts of the copolymer solution I, 3.7 parts of cellosolve and 5.5 parts of xylene and homogeneously mixed therewith with stirring, giving a fungicidal coating composition.

EXAMPLES 9 TO 12

Fungicidal coating compositions were prepared in the same manner as done in Example 8 from the ingredients shown below in Table 3 in the listed amounts (part).

TABLE 3

| | Example | | | |
|---|---|---|---|---|
| | 9 | 10 | 11 | 12 |
| Copolymer solution II | 61.9 | | | |
| Copolymer solution III | | 61.9 | | |
| Copolymer solution IV | | | 61.9 | 61.9 |
| Titanium White JR 602 | 23.2 | 23.2 | 23.2 | 23.2 |
| N-(Fluorodichloromethylthio)-phthalimide | 1 | | | |
| N-Dimethyl-N-phenyl-(fluorodichloromethylthio)-sulfamide | | 1 | | |
| 2-(4-Thiazolyl)benzimidazole | | | 1 | |
| N-(Trichloromethylthio)-phthalimide | | | | 2 |
| Cellosolve | 3.7 | 3.7 | 3.7 | 3.7 |
| Butyl acetate | 3.4 | 3.4 | 3.4 | 3.4 |
| Xylene | 6.8 | 6.8 | 6.8 | 5.8 |
| Total amount | 100.0 | 100.0 | 100.0 | 100.0 |

COMPARATIVE EXAMPLES 5 TO 9

Coating compositions were prepared in the same manner as in Examples 8 to 12 from equal amounts of same ingredients with the exception of using "Acrydic A 180" (trademark for acrylic resin 45% in solids content, manufactured by Dainippon Ink Chemicals Co., Ltd., Japan) in such a ratio as to afford the same solids content in place of each of copolymer solutions used in Examples 8 to 12. The ingredients and the amounts employed in Comparative Examples 5 to 9 each correspond to those respectively of Examples as follows: Comparative Example 5 vs. Example 8; Comparative Example 6 vs. Example 9; Comparative Example 7 vs. Example 10; Comparative Example 8 vs. Example 11; and Comparative Example 9 vs. Example 12.

Using the coating compositions prepared in Examples 8 to 12 and in Comparative Examples 5 to 9, fungi resistance test was conducted by the following method.

Fungi resistance test method

Using each coating composition, the fungi resistance test was conducted according to JIS Z 2911. The following three kinds of fungi were used for testing.

A: Exposure to a mixture of three fungi, i.e. *Aspergillus niger*, *Penicillium citrinum* and *Cladosporium cladosporioides*.

B: Exposure to Alternaria sp.
C: Exposure to Fusarium sp.

The results were evaluated according to the following criteria.

−: No growth of fungi on the surface of the specimen.
+: Growth of fungi over less than one-third the area of the specimen surface.
++: Growth of fungi over one-third to two-thirds the area of the specimen surface.
+++: Growth of fungi over more than two-thirds the area of the specimen surface.

Table 4 below shows the results.

TABLE 4

|  | A | | B | | C | |
| --- | --- | --- | --- | --- | --- | --- |
|  | 2nd Week | 4th Week | 2nd Week | 4th Week | 2nd Week | 4th Week |
| Example |  |  |  |  |  |  |
| 8 | − | − | − | − | − | − |
| 9 | − | − | − | − | − | − |
| 10 | − | + | − | − | − | − |
| 11 | − | − | − | − | − | − |
| 12 | − | − | − | − | − | − |
| Comparative Example |  |  |  |  |  |  |
| 5 | − | ++ | + | +++ | − | − |
| 6 | − | + | + | + | − | − |
| 7 | + | ++ | + | +++ | + | + |
| 8 | + | + | + | + | − | + |
| 9 | + | + | − | + | − | − |

Preparation of resins for coating composition (B)

| Preparation Example 5 | |
| --- | --- |
| Phenol | 94 parts |
| Succinic anhydride | 100 parts |
| Tributylamine | 1 part |

The above ingredients were mixed together and the mixture was reacted with stirring at 200° C. for 6 hours until the resin achieved the acid value/theoretical acid value ratio of 0.5. The resulting reaction product was in a solid form at room temperature and had a solids content of 100%.

The following mixture was added dropwise over a period of 3 hours to 479 parts of xylene heated to 100° C.

| Glycidyl methacrylate | 142 parts |
| --- | --- |
| n-Butyl methacrylate | 337 parts |
| Azoisobutyronitrile | 10 parts |

The mixture was aged at 100° C. for 2 hours, giving an epoxy group-containing acrylic resin having a solids content of 50% and a viscosity of E.

| Said reaction product | 195 parts |
| --- | --- |
| Said 50% epoxy group-containing acrylic resin | 958 parts |
| Xylene | 195 parts |

The above ingredients were mixed together and the mixture was reacted at 120° C. for 3 hours until the resin acid value of 3.0 or less was achieved, whereby a phenol-modified resin I was obtained which had a solids content of 50%, a viscosity of P and a weight-average molecular weight of 25000.

| Preparation Example 6 | |
| --- | --- |
| p-Chlorophenol | 129 parts |
| Succinic anhydride | 148 parts |
| Tributylamine | 1 part |

The above ingredients were mixed together and the mixture was reacted with stirring at 250° C. for 3 hours until the resin attained the acid value/theoretical acid value ratio of 0.5. The resulting reaction product was in a solid form at room temperature and had a solids content of 100%.

The following mixture was added dropwise over a period of 3 hours to 656 parts of butyl acetate heated to 110° C.

| Glycidyl acrylate | 256 parts |
| --- | --- |
| Methyl methacrylate | 200 parts |
| Styrene | 200 parts |
| Benzoyl peroxide | 7 parts |

The mixture was aged at 110° C. for 2 hours, giving an epoxy group-containing acrylic resin having a solids content of 50% and a viscosity of H.

| Said reaction product | 277 parts |
| --- | --- |
| Said 50% epoxy group-containing acrylic resin | 1312 parts |
| Butyl acetate | 277 parts |

The above ingredients were mixed together and the mixture was reacted at 130° C. for 2 hours until the resin acid value of 3.0 or less was achieved, whereby a phenol-modified resin II was obtained which had a solids content of 50%, a viscosity of T and a weight-average molecular weight of 35000.

| Preparation Example 7 | |
| --- | --- |
| Bisphenol A | 228 parts |
| Tetrahydrophthalic anhydride | 152 parts |
| Pyridine | 10 parts |
| Xylene | 370 parts |

The above ingredients were mixed together and the mixture was reacted with stirring at 140° C. for 18 hours until the resin attained the acid value/theoretical acid value ratio of 0.5. The resulting reaction product had a solids content of 50% and a viscosity of D.

The following mixture was added dropwise over a period of 3 hours to 2590 parts of xylene heated to 120° C.

| 3,4-Epoxycyclohexyl methacrylate | 290 parts |
| --- | --- |
| 2-Ethylhexyl acrylate | 1150 parts |
| Styrene | 1150 parts |
| Azoisobutyronitrile | 130 parts |

The mixture was aged at 120° C. for 2 hours, giving an epoxy group-containing acrylic resin having a solids content of 50% and a viscosity of L.

| Said reaction product | 760 parts |
| --- | --- |
| Said 50% epoxy group-containing | 5180 parts |

-continued

| acrylic resin |
| --- |

The above ingredients were mixed together and the mixture was reacted at 100° C. for 6 hours until the resin acid value of 3.0 or less was achieved, whereby a phenol-modified resin III was obtained which had a solids content of 50%, a viscosity of P and a weight-average molecular weight of 12000.

| Preparation Example 8 | |
| --- | --- |
| p-Cresol | 108 parts |
| Succinic anhydride | 100 parts |
| Tributylamine | 1 part |

The above ingredients were mixed together and the mixture was reacted with stirring at 200° C. for 6 hours until the resin achieved the acid value/theoretical acid value ratio of 0.5. The resulting reaction product was in a solid form at room temperature and had a solids content of 100%.

The following mixture was added dropwise over a period of 3 hours to 470 parts of butyl acetate heated to 120° C.

| | |
| --- | --- |
| Glycidyl methacrylate | 20 parts |
| 2-Hydroxyethyl methacrylate | 125 parts |
| Methyl methacrylate | 325 parts |
| Azoisobutyronitrile | 9 parts |

The mixture was aged at 100° C. for 2 hours, giving an epoxy group-containing acrylic resin having a solids content of 50% and a viscosity of S.

| | |
| --- | --- |
| Said reaction product | 209 parts |
| Said 50% epoxy group-containing acrylic resin | 940 parts |
| Butyl acetate | 209 parts |

The above ingredients were mixed together and the mixture was reacted at 120° C. for 3 hours until the resin achieved an acid value of 3.0 or less, whereby a phenol-modified resin IV was obtained which had a solids content of 50%, a viscosity of U and a weight-average molecular weight of 33000.

EXAMPLE 13

Using a paint conditioner, there were mixed together 56.0 parts of the phenol-modified resin I (50% solids content) prepared in Preparation Example 5, 5.0 parts of talc, 3.0 parts of red iron oxide, 0.5 part of "Erosil #200" (trademark for silica manufactured by Degussa, West Germany), 10.0 parts of cuprous oxide and 25.5 parts of ethylene glycol monoethyl ether for dispersion, giving an antifouling coating composition.

EXAMPLES 14 TO 19

Antifouling coating compositions were prepared in the same manner as done in Example 13 from the ingredients listed below in Table 5 in the amounts indicated.

TABLE 5

| | Example | | | | | | |
| --- | --- | --- | --- | --- | --- | --- | --- |
| | 13 | 14 | 15 | 16 | 17 | 18 | 19 |
| Phenol-modified resin I | 56 | 64 | | | | | |
| Phenol-modified resin II | | | 56 | 64 | | | |
| Phenol-modified resin III | | | | | 64 | | |
| Phenol-modified resin IV | | | | | | 64 | 48 |
| Talc | 5 | | 5 | | | | |
| Red iron oxide | 3 | | 3 | | | | |
| Erosil #200 | 0.5 | 1.0 | 0.5 | 1.0 | 1.0 | 1.0 | 0.5 |
| Cuprous oxide | 10 | | | | | | 10 |
| Ethylenebis (dithio-carbamic acid)zinc | | | 5 | | | | 5 |
| Ethylene glycol monoethyl ether | 25.5 | 35.0 | 30.5 | 35.0 | 35.0 | 35.0 | 36.5 |
| Total amount | 100.0 | 100.0 | 100.0 | 100.0 | 100.0 | 100.0 | 100.0 |

Using the coating compositions prepared in Examples 13 to 19, antifouling test was conducted by the same method as that described hereinbefore.

Table 6 below shows the results.

TABLE 6

| (Result of antifouling test) | | | |
| --- | --- | --- | --- |
| Month of Immersion | 6 | 12 | 18 |
| Example 13 | 0 | 0 | 0 |
| Example 14 | 0 | 0 | 5 |
| Example 15 | 0 | 0 | 0 |
| Example 16 | 0 | 0 | 5 |
| Example 17 | 0 | 0 | 5 |
| Example 18 | 0 | 0 | 5 |
| Example 19 | 0 | 0 | 0 |

The test results show that the antifouling coating compositions of the present invention exhibited outstanding antifouling property.

EXAMPLE 20

A tank was charged with 11.4 parts of the phenol-modified resin I prepared in Preparation Example 5, 2.4 parts of xylene, 3.4 parts of butyl acetate, 23.2 parts of titanium oxide ("Titanium White JR 602" manufactured by Teikoku Kagaku K.K., Japan) and 1 part of N-(trichloromethylthio)phthalimide. The mixture was prekneaded by a stirrer and dispersed by a sand mill to a particle size of 30 μm or less. The thus obtained dispersion was placed into a tank containing 50.5 parts of the phenol-modified resin I, 3.7 parts of cellosolve and 5.5 parts of xylene and homogeneously mixed therewith with stirring, giving a fungicidal coating composition.

EXAMPLES 21 TO 24

Fungicidal coating compositions were prepared in the same manner as done in Example 20 from the ingredients shown below in Table 7 in the listed amounts.

TABLE 7

| | Example | | | |
| --- | --- | --- | --- | --- |
| | 21 | 22 | 23 | 24 |
| Phenol-modified resin II | 61.9 | | | |
| Phenol-modified resin III | | 61.9 | | |
| Phenol-modified resin IV | | | 61.9 | 61.9 |
| Titanium White JR 602 | 23.2 | 23.2 | 23.2 | 23.2 |
| N-(Fluorodichloromethylthio)-phthalimide | 1 | | | |
| N-Dimethyl-N-phenyl-(fluorodichloromethylthio)-sulfamide | | 1 | | |

TABLE 7-continued

| | Example | | | |
|---|---|---|---|---|
| | 21 | 22 | 23 | 24 |
| 2-(4-Thiazolyl)benzimidazole | | | 1 | |
| N-(Trichloromethylthio)-phthalimide | | | | 2 |
| Cellosolve | 3.7 | 3.7 | 3.7 | 3.7 |
| Butyl acetate | 3.4 | 3.4 | 3.4 | 3.4 |
| Xylene | 6.8 | 6.8 | 5.8 | |
| Total amount | 100.0 | 100.0 | 100.0 | 100.0 |

Using the coating compositions prepared in Examples 20 to 24, fungi resistance test was conducted by the same method as that described hereinbefore.

Table 8 shows the results.

TABLE 8

| | A | | B | | C | |
|---|---|---|---|---|---|---|
| Example | 2nd Week | 4th Week | 2nd Week | 4th Week | 2nd Week | 4th Week |
| 20 | — | — | — | — | — | — |
| 21 | — | — | — | — | — | — |
| 22 | — | — | — | — | — | — |
| 23 | — | — | — | — | — | — |
| 24 | — | — | — | — | — | — |

What is claimed is:

1. A coating composition for preventing adhesion of organisms to a substrate or structure which comprises as its vehicles component a homopolymer or a copolymer, said homopolymer being prepared by homopolymerizing a phenol-modified unsaturated monomer, said phenol-modified unsaturated monomer being obtained by reacting (a) an unsaturated monomer containing an epoxy group and/or hydroxyl group with (b) an addition reaction product of a phenolic compound and a compound which is the anhydride of a dicarboxylic acid, and said copolymer being prepared by copolymerizing said phenol-modified unsaturated monomer with a radically polymerizable unsaturated monomer, said phenolic compound selected from the group consisting of:

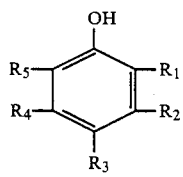

wherein $R_1$–$R_5$ each represent hydrogen, halogen, hydroxyl, alkyl, alkoxy nitro, cyano, or an amino group, and

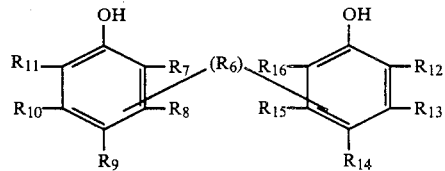

wherein $R_7$–$R_{16}$ each represent hydrogen, halogen, hydroxyl, alkyl, alkoxy, nitro, cyano, or an amino group, and $R_6$ represents an alkylene, —O—, —CH$_2$O—, —CH$_2$OCH$_2$—, or —SO$_2$—.

2. A coating composition according to claim 1 wherein the polymer as the vehicle component contains phenol ester group in an amount of about 0.01 to about 10 moles per kilogram of the polymer.

3. A coating composition according to claim 1 which contains an antifouling agent or a fungicidal agent.

4. A coating composition for preventing adhesion of organisms to a substrate or structure which comprises as its vehicle component a phenol-modified resin prepared by reacting (c) a resin containing an epoxy group and/or hydroxyl group with (b) an addition reaction product of a phenolic compound and a compound which is the anhydride of a dicarboxylic acid, and said phenolic compound is selected from the group consisting of:

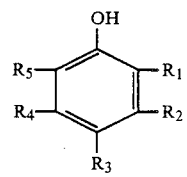

wherein $R_1$–$R_5$ each represent hydrogen, halogen, hydroxyl, alkyl nitro, cyano, or an amino group, and

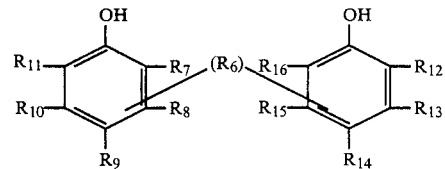

wherein $R_7$–$R_{16}$ each represent hydrogen, halogen, hydroxyl, alkyl, alkoxy, nitro, cyano, or an amino group, and $R_6$ represents an alkylene, —O—, —CH$_2$O—, —CH$_2$OCH$_2$—, or —SO$_2$—.

5. A coating composition according to claim 4 wherein the resin as the vehicle component contains phenol ester group in an amount of about 0.01 to about 10 moles per kilogram of the resin.

6. A coating composition according to claim 4 which contains an antifouling agent or a fungicidal agent.

* * * * *